US010160940B2

(12) United States Patent
Cifaldi

(10) Patent No.: US 10,160,940 B2
(45) Date of Patent: Dec. 25, 2018

(54) AUTOMATIC WINE STIRRER INCORPORATING A FERROMAGNETIC STIR BAR AND METHOD FOR AERATING WINE

(71) Applicant: Mario Cifaldi, Charlotte, NC (US)

(72) Inventor: Mario Cifaldi, Charlotte, NC (US)

( * ) Notice: Subject to any disclaimer, the term of this patent is extended or adjusted under 35 U.S.C. 154(b) by 256 days.

(21) Appl. No.: 14/655,200

(22) PCT Filed: Dec. 27, 2013

(86) PCT No.: PCT/US2013/078098
§ 371 (c)(1),
(2) Date: Jun. 24, 2015

(87) PCT Pub. No.: WO2014/106113
PCT Pub. Date: Jul. 3, 2014

(65) Prior Publication Data
US 2015/0329809 A1    Nov. 19, 2015

Related U.S. Application Data

(60) Provisional application No. 61/746,246, filed on Dec. 27, 2012.

(51) Int. Cl.
*B01F 13/08*    (2006.01)
*C12G 1/00*    (2006.01)
(Continued)

(52) U.S. Cl.
CPC ............ *C12G 1/00* (2013.01); *B01F 3/04794* (2013.01); *B01F 13/08* (2013.01);
(Continued)

(58) Field of Classification Search
CPC ...... C12G 1/00; B01F 13/08; B01F 15/00538; B01F 3/04794; B01F 13/0818;
(Continued)

(56) References Cited

U.S. PATENT DOCUMENTS 2,951,689 A * 9/1960 Asp ..................... B01F 13/0818
264/279.1
5,814,968 A * 9/1998 Lovegreen .......... H01M 2/1022
320/113
(Continued)

FOREIGN PATENT DOCUMENTS

EP    3308684 A1 *  4/2018

OTHER PUBLICATIONS

Mazurov, Oleg 'Vigorius stirring redefined. Part 2—electronics'. (Circuits@Home, a Solder Joint) [online blog], Oct. 6, 2009; Retrieved from the Internet; p. 1-7.
(Continued)

*Primary Examiner* — Charles Cooley
(74) *Attorney, Agent, or Firm* — Schwartz Law Firm, P.C.

(57) ABSTRACT

An automatic wine stirrer is adapted for aerating wine contained in an open vessel. The wine stirrer comprises a housing, and a fan assembly operatively mounted within the housing. The fan assembly comprises a rotatable hub, a plurality of fan blades attached to the hub, and an electric motor. At least one magnet is carried by the fan assembly. When the rotatable hub is substantially stopped, the magnet attracts and holds a ferromagnetic stir bar located inside the wine vessel. When the rotatable hub starts, the magnet rotates relative to the housing thereby rotating the stir bar and substantially swirling the wine contained in the wine vessel.

10 Claims, 5 Drawing Sheets

(51) Int. Cl.
  *B01F 15/00*  (2006.01)
  *B01F 3/04*  (2006.01)
  *A47G 23/02*  (2006.01)

(52) U.S. Cl.
  CPC .... B01F 13/0818 (2013.01); B01F 15/00538 (2013.01); *A47G 23/0241* (2013.01); *B01F 2003/04872* (2013.01); *B01F 2003/04943* (2013.01); *B01F 2215/0072* (2013.01)

(58) Field of Classification Search
  CPC .. B01F 2003/04872; B01F 2003/04943; B01F 2215/0072; A47G 23/0241
  USPC .................................................. 366/273–274
  See application file for complete search history.

(56) References Cited

U.S. PATENT DOCUMENTS

| | | | | |
|---|---|---|---|---|
| 6,241,359 B1* | 6/2001 | Lin | ...................... | F21S 10/002 362/101 |
| 6,295,749 B1* | 10/2001 | Lin | ........................ | G09F 19/08 40/406 |
| 6,332,706 B1* | 12/2001 | Hall | .................... | B01F 3/04794 261/83 |
| 7,791,441 B1* | 9/2010 | Jefferson | ................ | A63H 29/20 335/306 |
| 7,905,728 B2* | 3/2011 | Piontek | .................. | G09B 23/12 366/273 |
| 8,480,292 B2* | 7/2013 | Dushine | .................... | A23L 2/39 366/199 |
| 9,649,606 B2* | 5/2017 | Ruff | .................... | B01F 13/0022 |
| 9,873,097 B1* | 1/2018 | Dushine | .............. | B01F 13/0845 |
| 9,987,601 B2* | 6/2018 | Cheng | ................ | B01F 3/04794 |
| 2006/0133954 A1* | 6/2006 | Schroeder | ........... | B01F 13/0809 422/400 |
| 2006/0141614 A1* | 6/2006 | Puskeiler | ............ | B01F 3/04531 435/289.1 |
| 2008/0013400 A1* | 1/2008 | Andrews | ............ | B01F 13/0818 366/147 |
| 2015/0329809 A1* | 11/2015 | Cifaldi | ................ | B01F 13/0818 426/474 |
| 2017/0274330 A1* | 9/2017 | Cheng | ................ | B01F 3/04794 |
| 2018/0050311 A1* | 2/2018 | Kuperman | ......... | A47G 19/2205 |
| 2018/0140128 A1* | 5/2018 | Kodama | .............. | B01F 13/0854 |
| 2018/0195989 A1* | 7/2018 | Scaboo | ............... | B01F 13/0818 |

OTHER PUBLICATIONS

Mazurov, Oleg 'Vigorius stirring redefined. Part 1—mechanics'. (Circuits@Home, a Solder Joint) [online blog], Sep. 13, 2009; Retrieved from the Internet; p. 1-3.

Magnetic Stirrer. Product Blue Print Document version 0.1 [online], Tekla Labs, Retrived from the Internet (2014); entire document.

* cited by examiner

AUTOMATIC WINE STIRRER INCORPORATING A FERROMAGNETIC STIR BAR AND METHOD FOR AERATING WINE

TECHNICAL FIELD AND BACKGROUND OF THE INVENTION

This invention relates broadly and generally to an automatic wine stirrer and method for aerating wine. There are a number of styles of wine aerators and approaches to accomplish aeration. Some prior art wine aerators comprise small, in-bottle, hand-held, pour-through, or decanter top devices. These devices generally mix air into the wine as it flows through or over the decanter, thereby increasing exposure to oxygen and causing aeration. Injection-style hand-held acrylic aerators are also common in the industry. Injection-style aerators work by the Venturi effect, an application of Bernoulli's principle—featuring a wide tube that narrows. This method has been noted by wine experts to be too harsh for thinner skinned varietals, such as Pinot noir or Gamay. One example of a prior art automatic wine stirrer is disclosure in U.S. Pat. No. 6,332,706. The complete disclosure of this prior patent is incorporated herein by reference.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an automatic wine stirrer adapted for aerating wine contained in an open vessel. The wine stirrer comprises a housing, and a fan assembly operatively mounted within the housing. The fan assembly comprises a rotatable hub, a plurality of fan blades attached to the hub, and an electric motor. At least one magnet is carried by the fan assembly (e.g., mounted on top surface of the hub). Means are provided for electronically controlling intermittent rotation of the fan assembly such that the rotatable hub substantially stops and starts at predetermined intervals. The exemplary "means" may comprise a fan assembly including pulse-width modulation technology. When the rotatable hub is substantially stopped, the magnet attracts and holds a ferromagnetic stir bar located inside the wine vessel. When the rotatable hub starts, the magnet rotates relative to the housing thereby rotating the stir bar and substantially swirling the wine contained in the wine vessel. Swirling the wine in the vessel may promote increased exposure to air, thereby enhancing the flavor and fragrance of the wine.

The term "substantially stopped" as used herein means slowed sufficiently to allow ready magnetic attraction (i.e., "catching") of the ferromagnetic stir bar and hub magnet(s) upon placement of the wine vessel on the wine stirrer. When substantially stopped, the fan assembly may rotate between 0 and 20 RPM. The start or run speed is substantially constant, and may be as much as 500 RPM or more.

According to another exemplary embodiment, the housing comprises a non-magnetic top wall.

According to another exemplary embodiment, the top wall of the housing is constructed of a plastic material.

According to another exemplary embodiment, a printed circuit board is electronically connected to the fan assembly, and resides adjacent a bottom wall of the housing.

According to another exemplary embodiment, at least one rechargeable battery is operatively connected to the electric motor of the fan assembly.

According to another exemplary embodiment, the fan assembly comprises a multiple pin (male) connector electronically interconnecting the electric motor and printed circuit board (via female IC connector or header on PCB).

According to another exemplary embodiment, the fan assembly utilizes pulse-width modulation for controlling intermittent rotation between substantially stopped and start conditions.

According to another exemplary embodiment, a plurality of electrical terminals extend through the housing and are exposed on opposing top and bottom sides of the housing. Respective electrical terminals of multiple wine stirrers align and engage when stacked, thereby placing the stacked wine stirrers in electrical communication with each other.

In another exemplary embodiment, the present disclosure comprises in combination an open wine vessel, a ferromagnetic stir bar located inside the vessel, and the automatic wine stirrer described above.

According to one exemplary embodiment, the stir bar has a substantially X-shape and comprises a magnetic material selected from a group consisting of iron, nickel, and cobalt.

According to another exemplary embodiment, the stir bar comprises a synthetic resinous fluorine-containing polymer coating.

In yet another exemplary embodiment, the present disclosure comprises a method for aerating wine contained in an open wine vessel. The method includes placing the wine vessel on an automatic wine stirrer and intermittently rotating a stir bar contained in the wine vessel, such that the stir bar moves at predetermined intervals between a substantially stopped condition and a rotating condition.

BRIEF DESCRIPTION OF THE DRAWINGS

Exemplary embodiments of the present invention will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
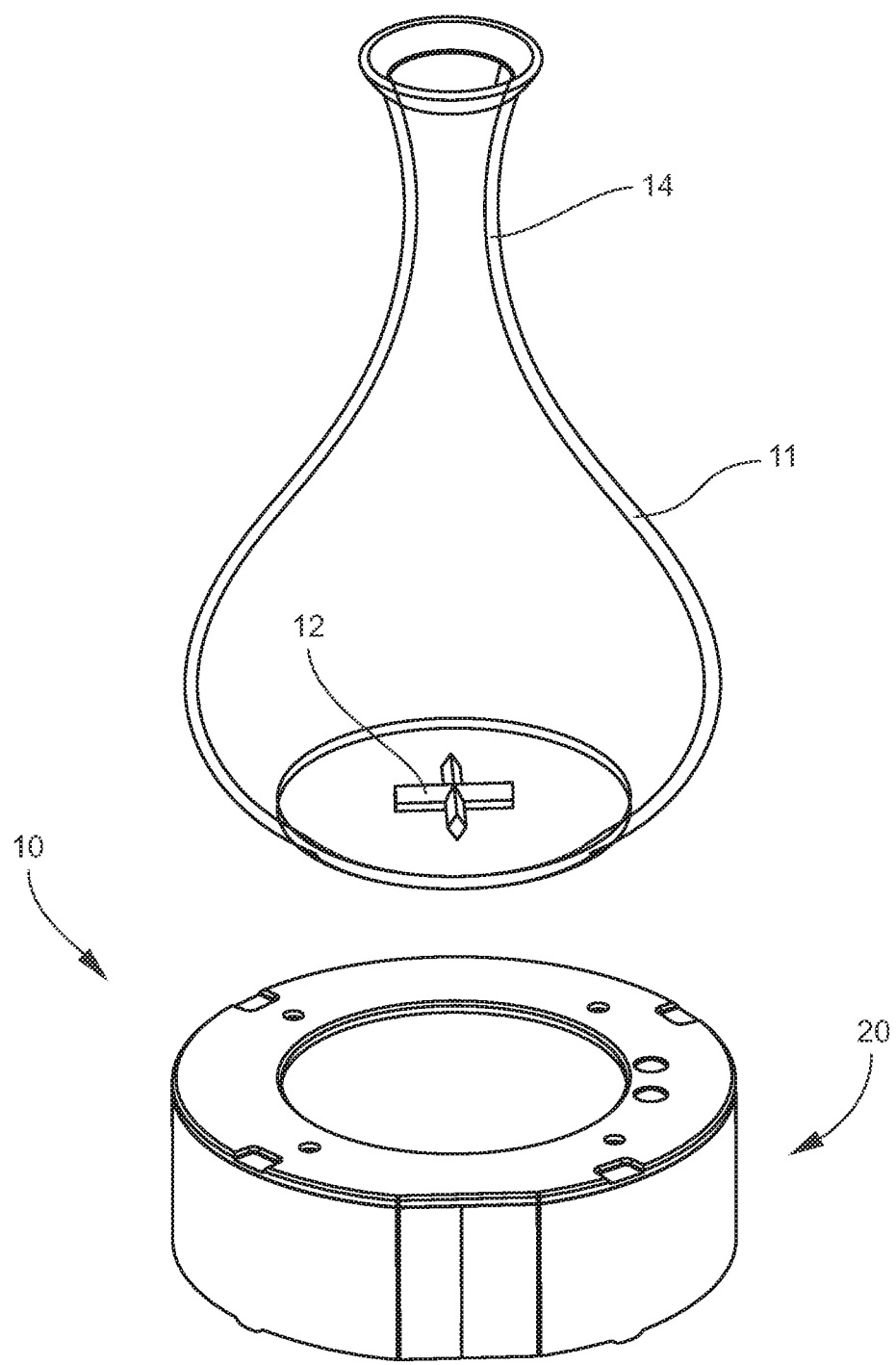
FIG. 1 is a perspective view an automatic wine stirrer and glass wine vessel according to one exemplary embodiment of the present disclosure.

Referring now specifically to the drawings, an automatic wine stirrer according to one exemplary embodiment of the present disclosure is illustrated in FIG. 1, and shown generally at reference numeral 10. The wine stirrer 10 is adapted for use in combination with an open top glass wine vessel 11 (e.g., decanter, carafe, or the like), and cooperates as described below with a small unattached stir bar 12 which functions to swirl the wine in the vessel 11, thereby promoting rapid and complete aeration. The exemplary stir bar 12 comprises a generally X-shaped ferromagnetic metal object coated with a synthetic resinous fluorine-containing polymer, such as that known commercially as TEFLON by E.I. Du Pont de Nemours and Company. The stir bar 12 may be fabricated primarily of iron, nickel, cobalt, or other magnetic material with sufficient specific gravity such that it rests unattached at a (non-magnetic) glass bottom of the wine-filled vessel 11. The neck 14 of the wine vessel 11 is sufficiently constricted to prevent the stir bar 12 from inadvertently falling out of the vessel 11 when the wine is poured.

Figure 2:
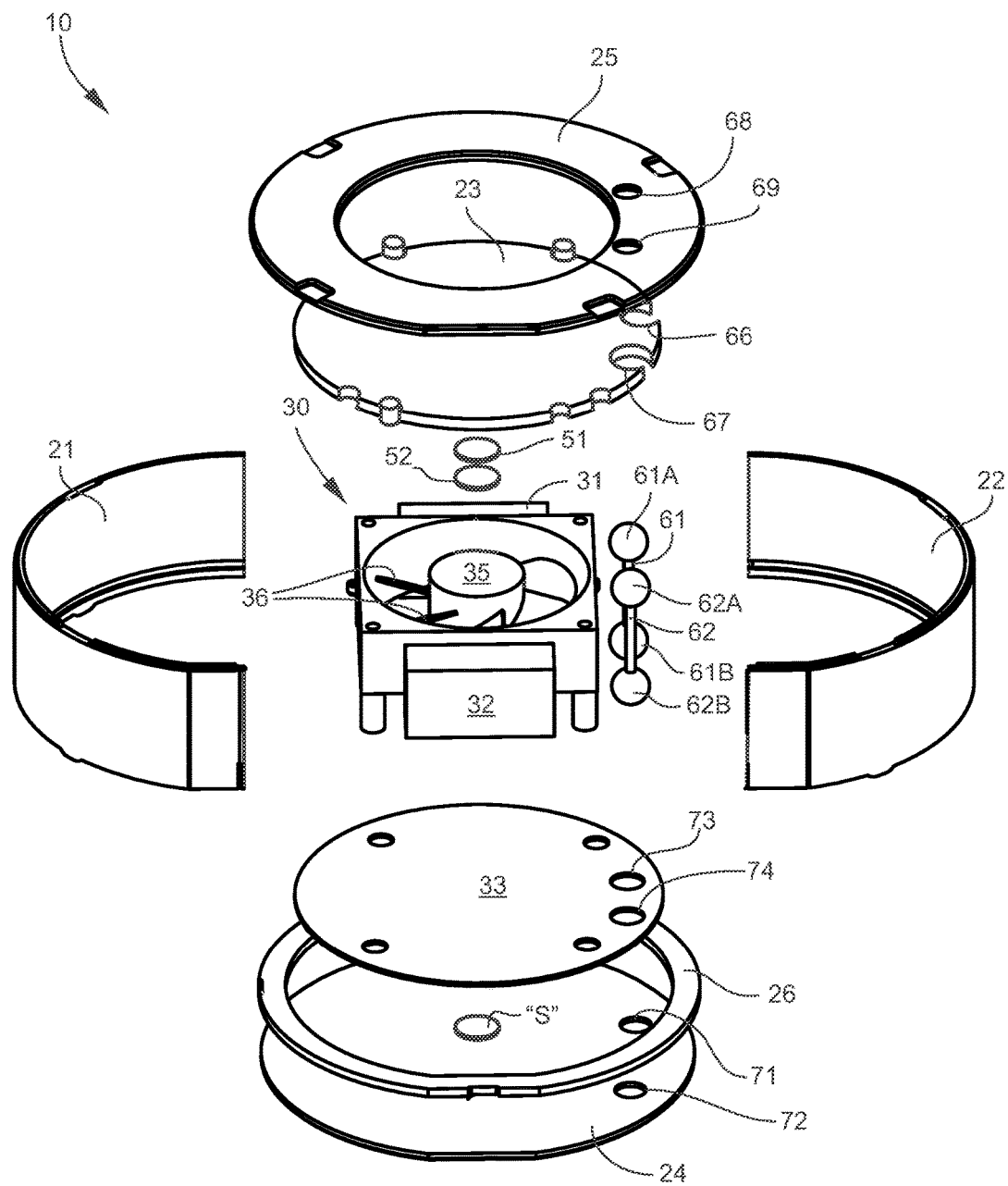
FIG. 2 is an exploded view of the exemplary wine stirrer.

As best shown in FIGS. 1 and 2, the exemplary wine stirrer 10 comprises a low-profile modular housing 20 formed by opposing arcuate (e.g., molded plastic) side walls 21, 22, continuous top and bottom walls 23, 24, and annular top and bottom assembly rings 25, 26. The top wall 23 may be fabricated of plastic; or alternatively, any other suitable non-magnetic material. The top and bottom assembly rings 25, 26 cooperate with suitable hardware, adhesives, heat or ultrasonic welding, or the like to join the housing components together. The housing 20 contains a square-frame micro fan assembly 30, batteries 31, 32, and printed circuit board 33.

Figure 3:
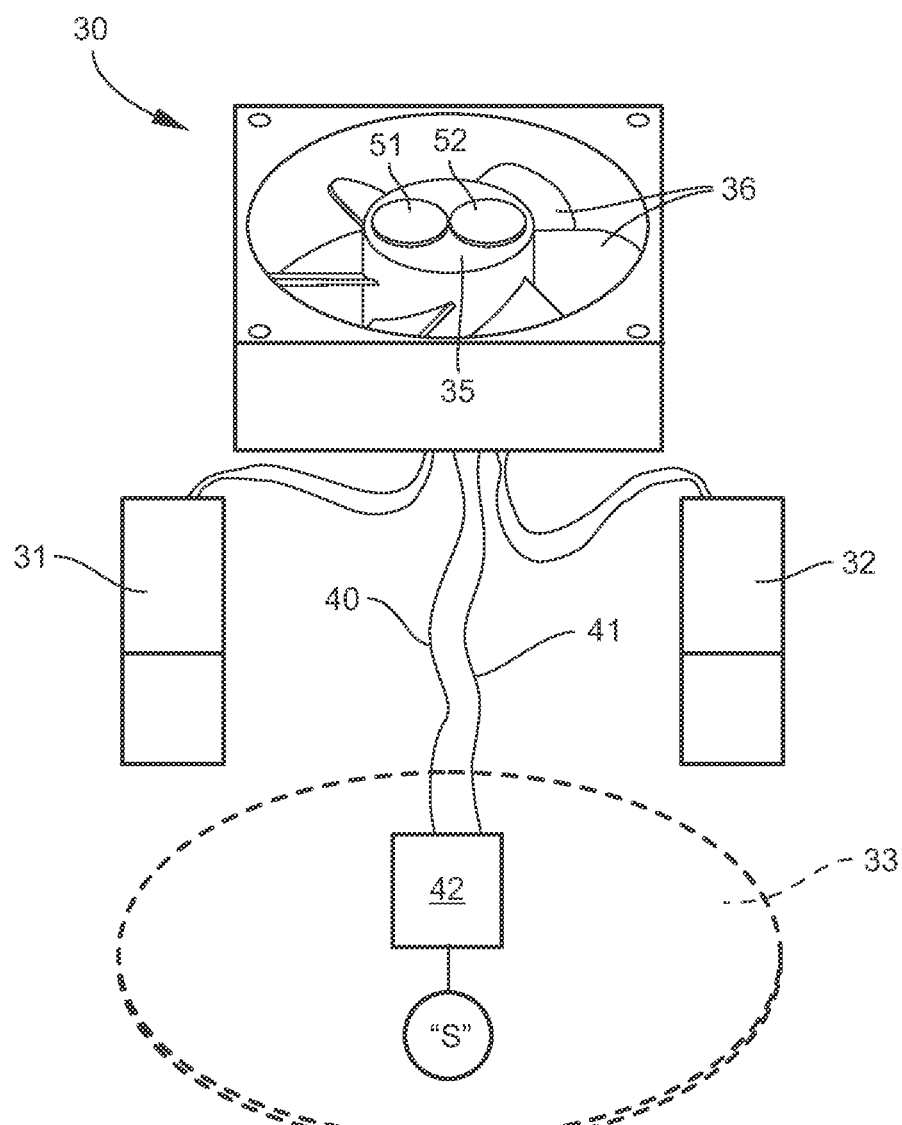
FIG. 3 is a schematic view illustrating electrical connection of the fan assembly, batteries, and PCB.
Figure 4:
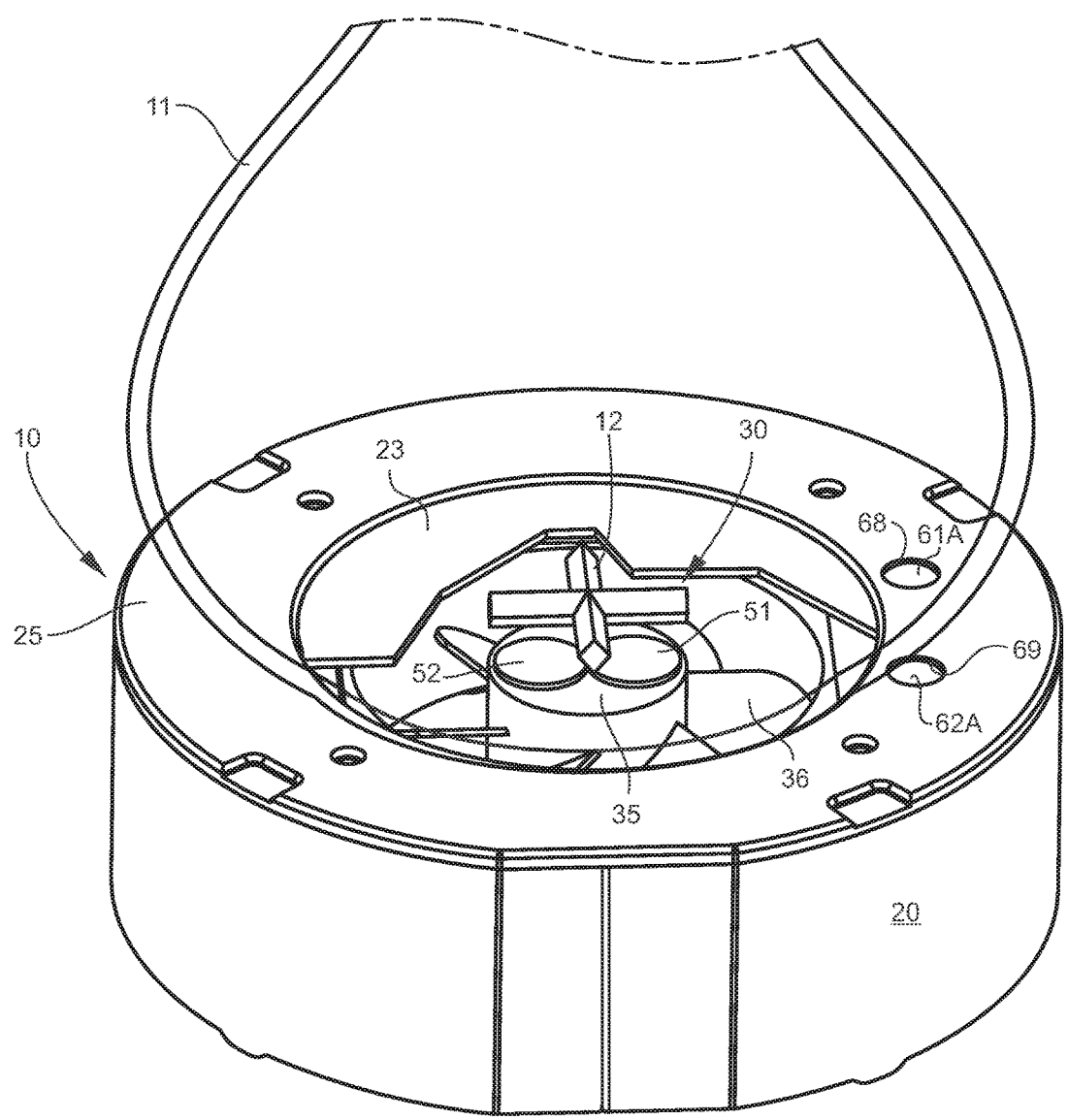
FIG. 4 is an enlarged fragmentary view of the wine vessel and wine stirrer with a portion of the housing broken away to illustrate interior components of the stirrer.

Referring to FIGS. 2, 3, and 4, the exemplary fan assembly 30 is operatively mounted within the housing 20, and comprises a rotatable hub 35, a plurality of fan blades 36 attached to the hub 35, and an electric motor 38. In one exemplary embodiment, the fan assembly 30 comprises a 3 or 4-pin, 12V DC micro fan driven by two 9V rechargeable batteries 31, 32 and utilizing conventional pulse width modulation (PWM) technology. As generally known and understood in the art, PWM is a common method of controlling micro fans, such as those used to cool circuitry in computers. Such fans are typically connected to a 4-pin connector—pinout: ground, power, sense, and control. The sense pin is used to relay the rotation speed of the fan, while the control pin comprises an open-drain or open-collector output. The speed control is performed by the fan motor based on the control signal. The PWM signal provides an ability to adjust the rotation speed of the fan assembly on the fly without changing the input voltage delivered to the motor. In the present implementation represented schematically in FIG. 3, the sense and control pins of the fan assembly 30 are connected by wires 40, 41 to the PCB 33 via female IC connector 42 (header or the like), while respective ground and power wires 43, 44 connect to the 9V batteries 31, 32 via standard battery snaps (not shown).

The PWM signal and board circuitry control intermittent rotation of the fan assembly 30 such that the rotatable fan hub 35 substantially stops and starts at predetermined intervals. Disk magnets 51, 52 are affixed to the rotatable hub 35 and reside immediately adjacent the non-magnetic (e.g., plastic) top wall 23 of the housing 20. The printed circuit board 33 resides adjacent the bottom wall 24 of the housing 20, and is cooled by airflow generated by the fan blades 36 during operation of the fan assembly 30. A manually-activated electric switch "S" may be located internally on or adjacent the bottom wall 24 (FIGS. 2 and 3), and in communication with control circuitry on the PCB 33 to selectively activate the fan assembly 30 when the plastic bottom wall 24 is pressed or flexed by the user. For example, a single press (or inward flex) of the bottom wall 24 may activate the fan assembly 30 for a five minute duration. Each subsequent press may add an addition 5 minutes of run time for a maximum stirrer operation period of up to 60 minutes or more.

Figure 5:
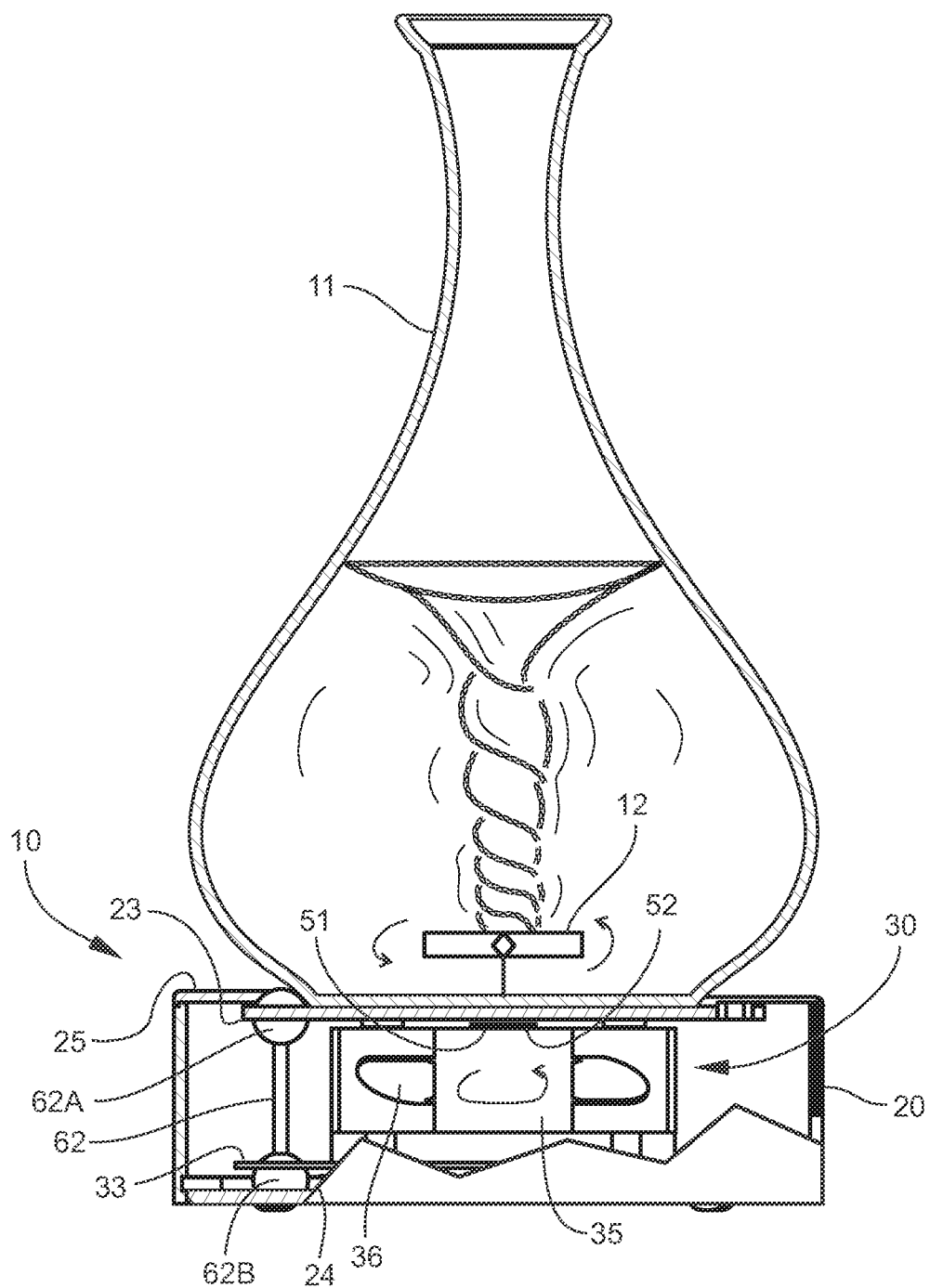
FIG. 5 is a cross-sectional view of the wine vessel and wine stirrer, and illustrating operation of the rotating fan assembly and magnetically-attached stir bar to aerate (or swirl) the wine contained in the vessel.

As best shown in FIGS. 4 and 5, when the wine vessel 11 is properly placed on the wine stirrer 10, within a slight recess defined by the inner perimeter of assembly ring 25, the disk magnets 51, 52 of fan assembly 30 attract the magnetic stir bar 12 and automatically align the bar 12 in a center of the glass vessel 11. The PWM fan assembly 30 described above "pulses" between programmed stopped and start (or run) conditions. In one example, the intermittent run ratio is 5:1—or (e.g.) 20 seconds running and 4 seconds stopped. When the rotatable fan hub 35 is substantially stopped, the disk magnets 51, 52 powerfully attract and hold the stir bar 12 located inside the wine vessel. By substantially stopping rotation of the disk magnets 51, 52, the wine vessel 11 can be removed from the wine stirrer 10 and replaced at anytime during operation of the fan assembly 30—such that when the fan assembly 30 is substantially stopped, the magnetic stir bar 12 is allowed to re-center and re-engage (or "catch") the disk magnets 51, 52 of the fan hub 35. When the rotatable hub 35 starts, the disk magnets 51, 52 rotate relative to the housing 20 thereby rotating the stir bar 12 and substantially swirling the wine contained in the glass vessel 11. Typical fan run speeds after starting may reach 50 to 500 RPM.

Battery Charging

In one exemplary embodiment, the wine stirrer 10 may comprise a number of stainless steel electrical terminals 61, 62 (FIGS. 2, 4, and 5) which extend through the housing 20, and which comprise respective spherical heads 61A, 61B and 62A, 62B exposed through openings 66, 67, 68, 69 formed with the top wall 23 and assembly ring 25, openings 71, 72 formed with bottom wall 24, and openings 73, 74 formed with the PCB 33. The electrical terminals 61, 62 of multiple wine stirrers 10 align and contact when stacked, thereby placing the stacked wine stirrers in electrical communication with each other. Offset "notching" or other suitable structure in the top and bottom walls of each housing prevents adjacent stacked wine stirrers from being arranged in an improper orientation.

Each wine stirrer 10 may also include a number of powerful internal cylinder magnets designed to promote and facilitate "tight" stacking and close contact of the electrical terminals. Once stacked, the entire assembly of wine stirrers (e.g., 4 or more) can be recharged simultaneously by a single charging base without removing batteries or plugging individual units into separate charging stations. One example of a battery charger and electronic device assembly for recharging stackable electronic devices is disclosed in prior U.S. Pat. No. 5,814,968. The complete disclosure of this prior patent is incorporated herein by reference. Alternatively, the exemplary wine stirrer may comprise a power port allowing it to be charged using a standard wall power charger (e.g., for consumer use).

Added Features of Alternative Embodiments

In other exemplary embodiments, the wine stirrer may comprise a number of LED indicator lights. LED lights on the topside of the stirrer may match table candlelight, and may visually indicate that the device is active. These or other LED lights may turn off once the pre-set fan duration expires. These or other LED lights may change to flashing red colors (to indicate when the wine stirrer is being charged), and then change to a non-flashing continuous red light when fully charged. When charging stacked units, 4 built-in LED indicator lights on each stirrer may flash blue to indicate a successful electrical connection to the single charging base. Alternative exemplary stirrers may also incorporate mechanical, optical and/or proximity detection designed to sense when the wine vessel is located on top of the wine stirrer. This allows the exemplary stirrer to automatically stop stirring once the wine vessel is removed, and to automatically activate stirring once the wine vessel is placed back on top of the wine stirrer.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. In combination with an open wine vessel and a ferromagnetic stir bar located inside said vessel, an automatic wine stirrer comprising:
   a housing;
   a fan assembly operatively mounted within said housing, and comprising a rotatable hub, a plurality of fan blades attached to said hub, and an electric motor;
   at least one magnet carried by said fan assembly and adapted for being magnetically connected to said stir bar; and
   means for electronically controlling intermittent rotation of said fan assembly, said means configured to control said fan assembly to spin said stir bar intermittently between a run condition sufficient for substantially swirling the wine contained in said wine vessel and a substantially stopped condition less than 20 RPM, whereby:
   (i) when said fan assembly is in the substantially stopped condition, said magnet attracts and holds said stir bar located inside said wine vessel, and
   (ii) when said fan assembly moves to the run condition, said magnet rotates relative to said housing thereby rotating said stir bar and substantially swirling the wine contained in said wine vessel.

2. A combination according to claim 1, wherein said housing comprises a nonmagnetic top wall.

3. A combination according to claim 2, wherein the top wall of said housing is constructed of a plastic material.

4. A combination according to claim 1, said means further comprising a printed circuit board electronically connected to said fan assembly, and residing adjacent a bottom wall of said housing.

5. A combination according to claim 4, and comprising at least one rechargeable battery connected to the electric motor of said fan assembly.

6. A combination according to claim 5, wherein said fan assembly comprises a multiple pin connector electronically interconnecting said electric motor and printed circuit board.

7. A combination according to claim 6, wherein said means utilizes pulse-width modulation for controlling said intermittent rotation between said substantially stopped condition and said run condition.

8. A combination according to claim 1, wherein said fan assembly comprises a square-framed plastic case.

9. A combination according to claim 1, wherein said stir bar comprises a magnetic material selected from a group consisting of iron, nickel, and cobalt.

10. A combination according to claim 9, wherein said stir bar comprises a synthetic resinous fluorine-containing polymer coating.

* * * * *